Nov. 2, 1926.
A. J. SCHREINER
1,605,619
RESERVE SUPPLY CONTROLLING DEVICE FOR LIQUID RECEPTACLES
Original Filed June 25, 1920    2 Sheets-Sheet 1
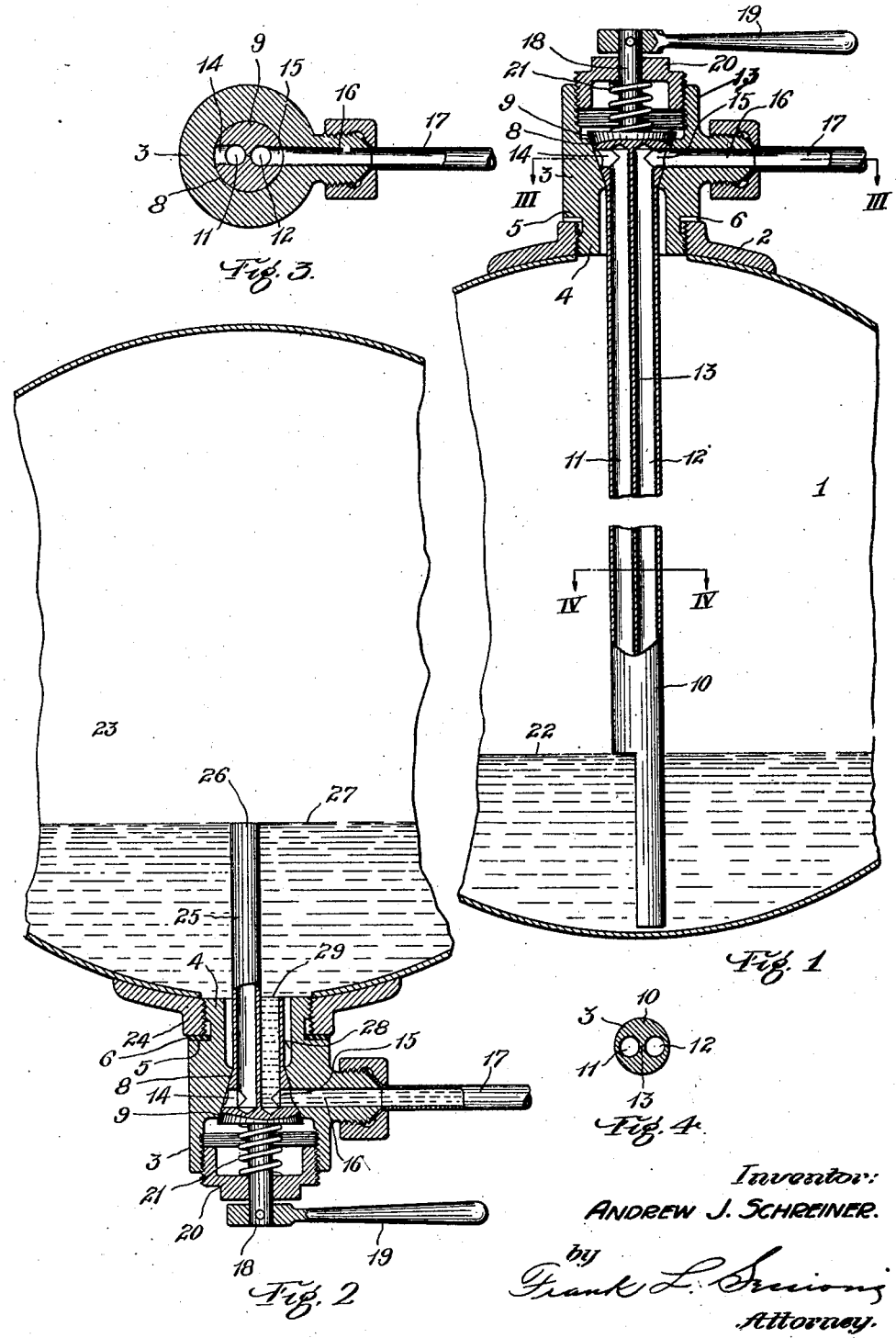
Inventor:
ANDREW J. SCHREINER.
by
Frank L. Freeman
Attorney.

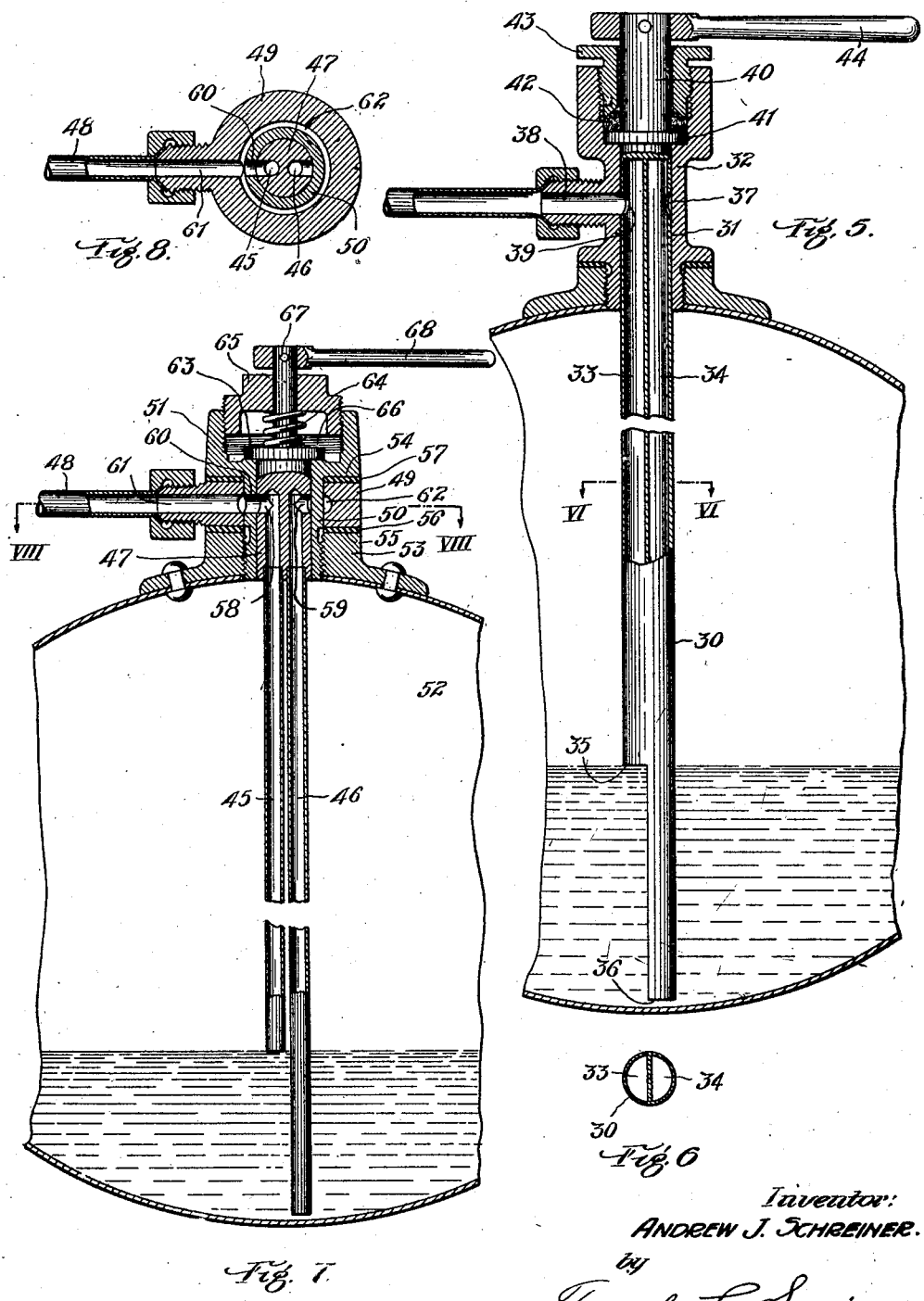

Patented Nov. 2, 1926.

1,605,619

UNITED STATES PATENT OFFICE.

ANDREW J. SCHREINER, OF CLEVELAND, OHIO.

RESERVE-SUPPLY CONTROLLING DEVICE FOR LIQUID RECEPTACLES.

Application filed June 25, 1920, Serial No. 391,847. Renewed May 1, 1926.

My invention is particularly useful in connection with gasoline tanks used upon motor vehicles but it may be applied to any liquid tank or other receptacle where it is desired that a warning be given of the approaching exhaustion of the supply of liquid in the receptacle before the supply is in fact completely exhausted.

Among the objects of my invention are the provision of a device which may be attached to or incorporated in the structure of the tank or receptacle so that a reserve supply of liquid may be available for use, after the warning of its approaching exhaustion has been given, without employing an auxiliary tank or partitions of any sort in the main tank; the provision of a simple, inexpensive but reliable reserve supply controlling device which may be attached either to the bottom or the top of the tank or receptacle and operated from the outside thereof; the provision of a reserve supply controlling device which may be installed in the ordinary feed pipe connection opening without requiring any additional hole to be made in the tank for installing the device or for its subsequent operation; the provision of a reserve supply controlling device which may be installed in the top of the supply tank for use in connection with vacuum or pressure liquid supply systems or be installed in the bottom of the supply tank for use in connection with either vacuum, pressure or gravity systems; and the provision of a reserve supply controlling device which may be easily installed upon tanks already in use as well as upon new tanks.

These and other objects are attained by the use of my invention described herein and shown in the accompanying drawings in which Fig. 1 is a vertical section of my invention installed in the top of a motor-vehicle, gasoline-supply tank;

Fig. 2 is a vertical section of my invention installed in the bottom of a motor-vehicle, gasoline-supply tank;

Fig. 3 is a section on line III—III of Fig. 1;

Fig. 4 is a section on line IV—IV of Fig. 1;

Fig. 5 is a vertical section of another form of my invention installed in the top of a motor-vehicle, gasoline-supply tank;

Fig. 6 is a section on line VI—VI of Fig. 5;

Fig. 7 is a vertical section of a modification of my invention installed in the top of a motor-vehicle, gasoline-supply tank; and Fig. 8 is a section on line VIII—VIII of Fig. 7.

In the drawings, and with particular reference to Fig. 1, a fragmentary portion of the main liquid supply tank is shown at 1. The reserve-supply controlling device which is shown threaded into the flanged connection, 2, at the top of tank, 1, is constructed in the following manner. The housing or body member, 3, which is provided with the threaded shank, 4, and the shoulder, 5, is screwed into the threaded, feed-pipe connection aperture in the tank. A packing washer, 6, may be employed to make a fluid tight connection between the tank and the body member, 3.

The housing, 3, has an aperture, 8, extending vertically through it, a portion of this aperture being accurately tapered. Fitting within the tapered portion of the aperture, 8, is the rotary valve member, 9, which has an elongated shank, 10, extending downwardly into the tank. The shank, 10, has two ducts or apertures, 11, 12, extending downward from the valve ports, and separated from each other by the partition, 13. The shank, 10, constitutes a duplex suction pipe, the apertures, 11, 12, being open at their lower ends.

The tapered valve portion, 9, is intersected by transverse apertures, 14, 15, each of which is adapted to register, upon rotation of the valve, with the outlet, 16, of the housing, 3, to which the service pipe, 17, is connected in any convenient manner. The valve-stem 18, extends above the tapered portion, 9, and may have secured to it the operating handle, 19. The upper portion, 13, of the valve housing, 3, may be threaded internally and a threaded plug, 20, may be provided to form an additional bearing for the valve-stem. Between the threaded plug, 20, and the shoulder formed by the enlarged tapered portion, 9, of the valve there may be inserted a compression spring, 21, for the purpose of holding the valve member, 9, securely to its seat, 8, in the housing, 3.

It will be seen that by turning the valve member, 9, to bring aperture, 14, to register with outlet, 16, liquid drawn from the tank will flow through suction pipe, 11, while by turning valve member, 9, so that aperture, 15, registers with outlet, 16, liquid drawn from the tank will flow through suction pipe, 12. 22 represents the approximate level of the liquid when it ceases to longer flow through duct, 11.

In order that a warning may be given of the approaching exhaustion of the supply of liquid in the tank and that a reserve supply may be still available after such warning has been given the suction pipe, 11, may be made to extend a shorter distance into the tank than does suction pipe, 12, which as shown in the drawings, extends to a point close to the bottom of the tank. By varying the lengths of suction pipes, 11 and 12, the device may be adapted to different supply tanks, and to give warning of the approaching exhaustion of liquid when any desired amount remains in the tank.

In Fig. 2 I have shown a device similar in every way to that shown in Fig. 1 but adapted for use in the bottom of the supply tank. Referring to Fig. 2, 23 is a fragmentary portion of the main liquid supply tank provided with a flanged outlet connection, 24, which is similar in every way to the connection, 2, shown in Fig. 1 with the exception that connection, 24, is at the bottom of the tank.

All parts of my invention shown in Fig. 2 are exactly like those shown in Fig. 1 with the exception of the shank, 25, of the valve member. As the device shown in Fig. 2 is connected to the bottom of the supply tank it is adapted to be used with either gravity, suction or pressure systems. One of the inlet or suction pipes, 26, extends upward in the tank to the desired level, 27, of the reserve supply of liquid while the other inlet or suction pipe, 28, has its inlet opening, 29, close to the level of the bottom of the tank so that all of the liquid in the tank may be withdrawn therefrom when the valve is turned to connect suction pipe, 28, with the outlet aperture, 16.

In the forms of my invention shown in Figs. 5 and 7 the tapered valve member is not used. In Fig. 5 a cylindrical shank or duplex, suction-pipe, 30, is shown rotatably mounted and secured in an aperture, 31, in the housing, 32, of the reserve supply controlling device. As in the device shown in Fig. 1 two suction or inlet apertures, 33—34, extend longitudinally in shank, 30, one of them opening into the tank at a point, 35, a suitable distance above the bottom of the tank to provide the desired reserve supply and the other opening into the tank at the point, 36, close to the bottom thereof so that all of the contents of the tank may be withdrawn through the duct, 34, when the valve is turned so that the port, 37, registers with the outlet port, 38.

Duct, 33, is provided with a port or aperture, 39, which is also adapted to register with outlet, 38, in order to permit liquid to be withdrawn from the tank down to the level of the open end, 35, of duct, 33.

In order to provide a fluid tight seal about the valve stem, 40, there may be provided a shoulder, 41, upon the valve stem adapted to be seated upon a corresponding shoulder of the housing, 32. Packing, 42, may be employed together with the well known form of packing gland shown at 43 to hold the shoulder, 41, of the valve stem to its seat upon the housing and make a fluid tight joint about the valve stem in the housing. A lever, 44, may be secured to the protruding valve stem for operating the device.

In the form of my invention shown in Fig. 7, two separate inlet or suction tubes, 45—46, are shown employed. These tubes are fitted into apertures in the valve member, 47. The valve member, 47, is cylindrical and operates in a similar manner to the valve shown in Fig. 5.

In order that the service or feed pipe, 48, may extend in any direction from the supply tank there may be provided the swivel connector, 49, which is rotatable about the shank, 50, of the housing, 51. The housing, 51, is shown connected to the tank, 52, by being threaded into the feed pipe connection, 53. A shoulder, 54, is provided upon the housing, 51, between which and a suitably faced surface, 55, upon the feed pipe connection member, 53, the swivel connector, 49, is securely clamped. Packing washers such as 56 and 57 may be employed to insure fluid tight joints.

The transverse apertures, 58, 59, intersecting respectively with the extensions to apertures, 45 and 46, of the valve member, are adapted to register with a transverse aperture, 60, extending through the wall of the shank, 50, of the body member, 51. In order that liquid may have access to the outlet, 61, regardless of its position relative to the aperture, 60, an annular aperture is shown formed in the bore of the swivel connector, 49. It is obvious that this annular groove or aperture may be formed in the outer surface of shank, 50, instead of in the bore of the swivel connector, 49, if desired.

Instead of the fibrous packing shown at 42 in Fig. 5 the valve member, 47, of the device shown in Fig. 7 is provided with a shoulder, 63, seated upon a corresponding shoulder upon body member, 51, and held thereto in fluid tight relation by the spring, 64, inserted between the threaded plug, 65, and an upwardly facing shoulder, 66, upon the valve member, 47.

As in the other forms of my invention the valve stem, 67, extends outward beyond its supporting members and may have secured to it a lever, 68, for operating the valve.

The manner of installing and operating my invention will be obvious to those skilled in the art. For its installation it is only necessary to provide a suitable means for connecting the device to the tank which means may be the threaded connection shown in the drawings or any other suitable means. With the device so mounted and the feed pipe leading to the point where the liquid is to be used the valve is turned so that the warning suction pipe is connected to the outlet from which the feed pipe leads. When the supply of liquid fails, the valve may be turned so that the suction pipe which extends to the bottom of the tank is connected to the outlet and thereafter all of the liquid may be withdrawn from the supply tank. When the supply of liquid in the supply tank has been replenished, the valve may again be set to give warning when the level of the reserve supply has been reached.

Having thus described my invention I claim:

1. The combination with a liquid receptacle, of a valve housing having an aperture opening into said receptacle and an outlet opening from said aperture, a rotary valve member in said aperture having an enlarged portion seated upon the outwardly presented wall of said housing surrounding said aperture, said valve having a plurality of ports each adapted upon rotation of said valve member to register with said outlet opening, said valve member extending into said receptacle and having separate ducts leading respectively from said ports and opening into said receptacle, and means outside of said receptacle for holding said valve member to its seat upon said wall.

2. The combination with a liquid receptacle, of a valve housing having an aperture opening into said receptacle and an outlet opening from said aperture, a rotary valve member in said aperture having an enlarged portion seated upon the outwardly presented wall of said housing surrounding said aperture, said valve having a plurality of ports each adapted upon rotation of said valve member to register with said outlet opening, said valve member extending into said receptacle and having separate ducts leading respectively from said ports and opening into said receptacle at respectively different heights above the bottom thereof, and means outside of said receptacle for holding said valve member to its seat upon said wall.

3. The combination with a liquid receptacle, of a valve housing having an aperture opening into said receptacle and an outlet opening from said aperture, a rotary valve member in said aperture, said valve member having a plurality of ports each adapted upon rotation of said valve member to register with said outlet opening, said valve member extending into said receptacle and having separate ducts leading respectively from said ports and opening into said receptacle at different heights above the bottom thereof, and means outside of said receptacle for holding said valve member in said aperture.

4. The combination with a liquid receptacle, of a valve housing having an aperture opening into said receptacle and an outlet opening from said aperture, a rotary valve member in said aperture having an enlarged portion seated upon the outwardly presented wall of said housing surrounding said aperture, said valve member having a plurality of ports each adapted upon rotation of said valve to register with said outlet opening, said valve extending into said receptacle and having separate ducts leading respectively from said ports and opening into said receptacle, said valve member extending outward from said housing and being adapted to receive an operating member, a plug secured in said aperture surrounding said outwardly extending portion of said valve member and resilient means interposed between said plug and said enlarged portion of said valve member to hold the latter to its seat upon said wall.

5. The combination with a liquid receptacle, of a valve housing having a hollow shank secured in the outlet opening of said receptacle, a rotary valve member fitting in said hollow shank and extending into said receptacle, said housing having an outlet opening through the wall of said shank, said valve member having a plurality of ports each adapted to register with said outlet opening and separate ducts leading from said ports into said receptacle, said valve housing having a transverse shoulder surrounding said shank, a swivel connector surrounding said shank between said shoulder and the outwardly presented wall surrounding said outlet opening of said receptacle making a fluid tight joint with said housing and the wall of said receptacle, said swivel connector having a discharge opening through its wall and being adapted to have a service pipe connected thereto, and an annular groove in the bore of said connector surrounding said shank and opening into said discharge opening said valve member having an enlarged portion seated upon the outwardly presented wall of said housing surrounding said valve member, and means outside of said receptacle for holding said valve member to its seat upon said wall.

6. The combination with a liquid receptacle, of a valve housing having an aperture of circular cross section opening into said receptacle and an outlet opening, from said aperture, a rotary valve member fitting in said aperture having two ports each adapted upon rotation of said valve member to register with said outlet opening, said valve member having an elongated shank extending into said receptacle having two ducts leading respectively from said ports and opening into said receptacle, said valve member being removable from said aperture from outside said receptacle, and means for holding said valve member in said aperture.

7. In apparatus of the class described, a valve housing having a hollow shank adapted to be screwed into the internally threaded outlet opening of a liquid receptacle, a rotary valve member fitting in said hollow shank and adapted to extend into the receptacle to which said housing may be secured, said housing having a discharge port through the wall of said hollow shank, said valve member having two ports each adapted to register with said discharge port and separate ducts leading respectively from said ports and opening out of said valve member at different heights above the bottom of said receptacle, and means for detachably securing said valve member in said aperture, said means acting upon the outwardly extended portion of said valve member whereby said valve member may be removed from said aperture without removing said valve housing from said receptacle.

In testimony whereof I affix my signature.

ANDREW J. SCHREINER.